(12) United States Patent
Mikami

(10) Patent No.: US 11,713,244 B2
(45) Date of Patent: Aug. 1, 2023

(54) METHOD FOR PRODUCING BROMINE

(71) Applicant: SUMITOMO CHEMICAL COMPANY, LIMITED, Tokyo (JP)

(72) Inventor: Yusuke Mikami, Ehime (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 1027 days.

(21) Appl. No.: 16/525,829

(22) Filed: Jul. 30, 2019

(65) Prior Publication Data

US 2020/0039821 A1 Feb. 6, 2020

(30) Foreign Application Priority Data

Aug. 2, 2018 (JP) .................................. 2018-145754

(51) Int. Cl.
*C01B 7/00* (2006.01)
*B01J 19/00* (2006.01)
(Continued)

(52) U.S. Cl.
CPC ............. *C01B 7/096* (2013.01); *B01J 19/245* (2013.01)

(58) Field of Classification Search
CPC ............................... C01B 7/096; B01J 19/245
(Continued)

(56) References Cited

U.S. PATENT DOCUMENTS 3,353,916 A * 11/1967 Lester ..................... C01B 7/096
502/228
4,131,626 A * 12/1978 Sharma ................... C01B 7/096
570/259
(Continued)

FOREIGN PATENT DOCUMENTS

| JP | 2009525395 A | 7/2009 |
|----|--------------|--------|
| JP | 2012200700 A | 10/2012 |
| WO | 2007094995 A2 | 8/2007 |

OTHER PUBLICATIONS

Ullmann's Encyclopedia of Industrial Chemistry, vol. B4, "Fixed-bed Reactors", 2000, pp. 200-238 (Year: 2000).*
(Continued)

*Primary Examiner* — James E McDonough
(74) *Attorney, Agent, or Firm* — Meunier Carlin & Curfman LLC

(57) ABSTRACT

To provide a method that enables production of bromine in good yield. A method for producing bromine includes: a step of supplying a gas containing a bromine compound and a gas containing oxygen to a reactor that includes a catalyst packed bed, and oxidizing the bromine compound to obtain a gas containing bromine, in which the step satisfies the following $0.30 \leq a \leq 0.55$ and $0.40 \leq L1 \leq 6.0$; where "a" represents porosity [-] of the catalyst packed bed, and "L1" is defined by the following Formula (3): Formula (3) $L1=L2V/(P(aV+b))\times(T+273.14)/273.14$; wherein L2: Superficial velocity of reaction gas [m/s]; LP: Reaction pressure [atm]; T: Reaction temperature [° C.]; V: Reactor volume corresponding to catalyst packed bed [L]; a: Porosity of catalyst packed bed [-] and b: Pore volume of catalyst packed bed [L].

10 Claims, 1 Drawing Sheet

(51) Int. Cl.
*C01B 7/09* (2006.01)
*B01J 19/24* (2006.01)

(58) Field of Classification Search
USPC .......................................... 423/502
See application file for complete search history.

(56) References Cited

U.S. PATENT DOCUMENTS

| | | | | |
|---|---|---|---|---|
| 5,366,949 | A | * 11/1994 | Schubert | ................ B01J 27/135 |
| | | | | 502/227 |
| 2011/0015458 | A1 | * 1/2011 | Waycuilis | ................ C01B 7/096 |
| | | | | 423/502 |
| 2013/0039842 | A1 | * 2/2013 | Nishida | ................ B01J 37/0018 |
| | | | | 423/502 |

OTHER PUBLICATIONS

Moser, Maximilian et al., "Catalyst Distribution Strategies in Fixed-Bed Reactors for Bromine Production", Ind. Eng. Chem. Res. 2014, 53, 9067-9075.

* cited by examiner

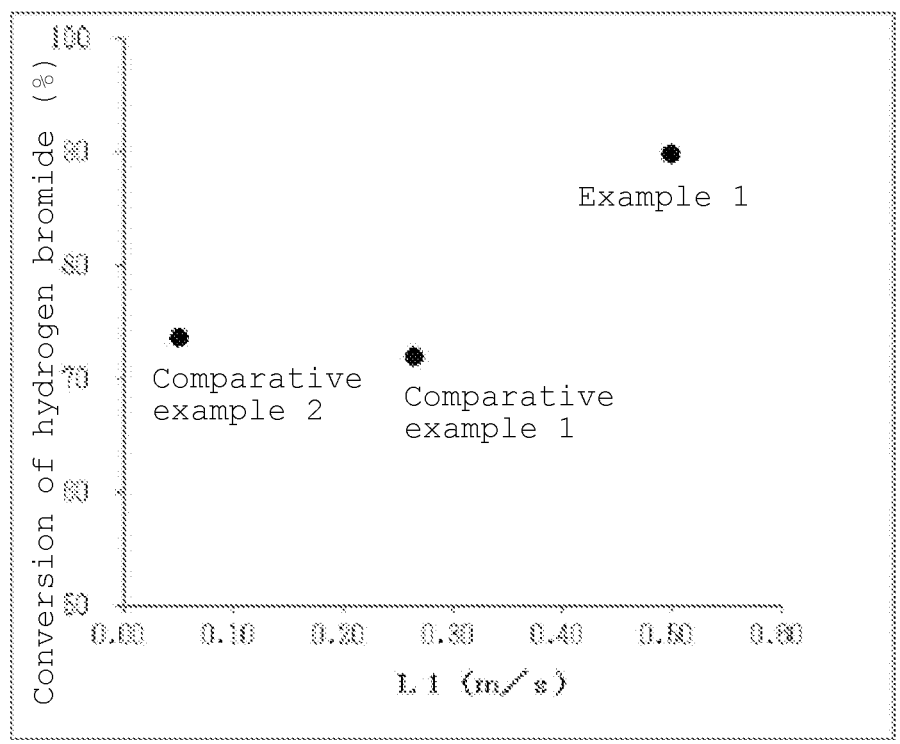

METHOD FOR PRODUCING BROMINE

FIELD OF THE INVENTION

The present invention relates to a method for producing bromine.

BACKGROUND

Bromine is useful, for example, as a raw material for producing flame retardants such as tetrabromobisphenol A and decabromodiphenyl ether. In a method for producing bromine disclosed in each of literatures, Patent document 1, Patent document 2, and Non-Patent Document 1, a bromine compound is oxidized with oxygen.

PRIOR ART DOCUMENT

Patent Document

[Patent Document 1] JP-A-2009-525395
[Patent Document 2] JP-A-2012-200700
[Non-Patent Document 1] J. Perez-Ramirez et al., Ind. Eng. Chem. Res. 2014, 53, 9067-9075

However, the method disclosed in each of those literatures does not always bring a sufficient yield of bromine. Therefore, an object of the present invention is to provide a method for producing bromine in good yield.

SUMMARY

Described herein are the following methods.

[1] A method for producing bromine, including
a step of supplying a gas containing a bromine compound and a gas containing oxygen to a reactor that includes a catalyst packed bed, and oxidizing the bromine compound to obtain a gas containing bromine,
in which the step satisfies the following Inequality (1) and Inequality (2):

$$0.30 \leq a \leq 0.55 \quad \text{Inequality (1)}$$

$$0.40 \leq L1 \leq 6.0 \quad \text{Inequality (2)}$$

where "a" represents porosity [-] of the catalyst packed bed, and "L1" is defined by the following Formula (3):

$$L1 = L2V/(P(aV+b)) \times (T+273.14)/273.14 \quad \text{Formula (3)}$$

L2: Superficial velocity of reaction gas [m/s]
P: Reaction pressure [atm]
T: Reaction temperature [° C.]
V: Reactor volume corresponding to catalyst packed bed [L]
a: Porosity of catalyst packed bed [-]
b: Pore volume of catalyst packed bed [L].

[2] The method for producing bromine according to [1], in which the bromine compound is hydrogen bromide.

[3] The method for producing bromine according to [1] or [2], in which the bromine compound at an outlet of the reactor has a conversion of 90% or more.

[4] The method for producing bromine according to any one of [1] to [3], in which a temperature at an outlet of the reactor is 250° C. to 400° C.

[5] The method for producing bromine according to any one of [1] to [4], in which the catalyst is at least one type of metal or metal compound selected from the group consisting of ruthenium, a compound of ruthenium, copper, a compound of copper, and titanium and a compound of titanium.

[6] The method for producing bromine according to any one of [1] to [5], in which the reactor is an adiabatic reactor.

[7] The method for producing bromine according to any one of [1] to [6], in which the reactor includes two or more catalyst packed beds connected in series.

[8] The method for producing bromine according to [7], in which a temperature at an outlet of the lowermost catalyst packed bed with respect to a flow direction of the gas containing a bromine compound is lower than a temperature at an outlet of the catalyst packed bed of immediately upstream side of the lowermost catalyst packed bed.

[9] The method for producing bromine according to [7] or [8], in which the uppermost catalyst packed bed with respect to a flow direction of the gas containing a bromine compound includes titanium oxide as a catalyst, and the lowermost catalyst packed bed with respect to a flow direction of the gas containing a bromine compound includes at least one selected from the group consisting of metallic ruthenium and a ruthenium compound as a catalyst.

[10] The method for producing bromine according to any one of [7] to [9], further including
supplying the gas containing oxygen to each catalyst packed bed.

In some examples, bromine can be produced in good yield using the methods described herein.

BRIEF DESCRIPTION OF THE DRAWINGS

FIG. 1 is a view showing a relationship between L1 and a conversion of hydrogen bromide.

DETAILED DESCRIPTION

The present invention will hereinafter be described in detail.

Examples of a bromine compound-containing gas include brominated aliphatic hydrocarbons such as vinyl bromide, 1,2-dibromoethane, methyl bromide, ethyl bromide, propyl bromide, and allyl bromide; brominated aromatic hydrocarbons such as dibromobenzene and bromobenzene; and hydrogen bromide. The bromine compound-containing gas may include one type, or two or more types of bromine compounds. In addition, the bromine compound-containing gas may include gases other than bromine compounds: for example, nitrogen, carbon dioxide, helium, argon, or water vapor. The bromine compound can be selected in view of a variety of factors. For example, the bromine compound can be selected in view of reaction yield. In some examples, the bromine compound is hydrogen bromide or methyl bromide. In some examples, the bromine compound is hydrogen bromide.

When a hydrogen bromide-containing gas is used as the bromine compound-containing gas, the hydrogen bromide-containing gas may include hydrogen bromide generated by a reaction of hydrogen with bromine; hydrogen bromide generated by a pyrolytic reaction or a combustion reaction of a bromine compound; hydrogen bromide reproduced by a bromination reaction of an organic compound such as an alkane and an aromatic compound with bromine; hydrogen bromide reproduced by a hydrolysis reaction of a brominated hydrocarbon, an amination reaction of a brominated hydrocarbon, a Friedel-Crafts alkylation reaction of an alkyl bromide with an aromatic compound, a Friedel-Crafts acylation reaction of an acyl bromide with an aromatic compound, and a coupling reaction of a brominated organic compound; hydrogen bromide recovered from an oxidation reaction of hydrogen bromide to bromine or a bromination reaction of an alkene; and hydrogen bromide obtained by vaporizing a hydrobromic acid-containing aqueous solution or organic solvent solution.

Examples of components other than hydrogen bromide in a hydrogen bromide-containing gas include brominated aromatic hydrocarbons such as ortho-dibromobenzene and bromobenzene; aromatic hydrocarbons such as toluene and benzene; brominated aliphatic hydrocarbons such as vinyl bromide, 1,2-dibromoethane, methyl bromide, ethyl bromide, propyl bromide, and allyl bromide; aliphatic hydrocarbons such as methane, acetylene, ethylene and propylene; and inorganic gases such as nitrogen, argon, carbon dioxide, carbon monoxide, hydrogen, water vapor, helium, carbonyl sulfide, and hydrogen sulfide.

When a hydrogen bromide-containing gas is used as the bromine compound-containing gas, hydrogen bromide is oxidized to obtain water and bromine. When a gas containing a brominated aromatic hydrocarbon or brominated aliphatic hydrocarbon is used as the bromine compound-containing gas, a brominated aromatic hydrocarbon or brominated aliphatic hydrocarbon is oxidized to obtain carbon dioxide, water, and bromine. When the bromine compound-containing gas contains components other than a bromine compound, for example, an aromatic hydrocarbon or aliphatic hydrocarbon is oxidized to carbon dioxide and water, and carbon monoxide is oxidized to carbon dioxide.

When a methyl bromide-containing gas is used as the bromine compound-containing gas, as the methyl bromide, methyl bromide used for fumigation of soil and the like may be recovered and used.

A bromine compound in the bromine compound-containing gas can have a concentration of 10 volume % or more (e.g., 20 volume % or more, or 25 volume % or more). The higher the concentration, the less the energy is required for separation of generated bromine and/or recycle of unreacted oxygen, which is cost-effective.

Examples of an oxygen-containing gas include pure oxygen, and a gas that contains oxygen and components other than oxygen.

Examples of the gas containing oxygen and components other than oxygen include air and a gas obtained by mixing pure oxygen with gases such as nitrogen, carbon dioxide, helium, argon, and water vapor. Pure oxygen may be obtained by an ordinary industrial method such as pressure swing or cryogenic separation of air. In some examples, the oxygen-containing gas is pure oxygen or air. In some examples, the oxygen-containing gas is air.

Oxygen can be supplied at a theoretical molar quantity or more relative to a bromine compound. For example, when a hydrogen bromide-containing gas is used as a raw material, a theoretical molar quantity of oxygen per 1 mol of hydrogen bromide is 0.25 mol. In some examples, from 0.25 mol to 2 mol of oxygen can be supplied per 1 mol of hydrogen bromide (e.g., from 0.40 mol to 1.0 mol of oxygen per 1 mol of hydrogen bromide). Supplying 0.25 mol or more of oxygen per 1 mol of hydrogen bromide enables a high conversion of hydrogen bromide, and 2 mol or less of oxygen per 1 mol of hydrogen bromide is energy efficient when a generated bromine and unreacted oxygen are separated.

A catalyst packed bed herein indicates a packed catalyst, or the whole of a packed catalyst and an inert substance that dilutes the catalyst. The top and/or bottom of a catalyst packed bed may be packed with an inert substance. However, a packed bed consisting of an inert substance is not considered to be a catalyst packed bed.

In the methods described herein, porosity (a) of a catalyst packed bed is a value calculated, for example, by the following formula.

$$a=((\text{Reactor volume corresponding to catalyst packed bed})-(\text{volume occupied by catalyst packed bed}))/(\text{reactor volume corresponding to catalyst packed bed})$$

The reactor volume corresponding to the catalyst packed bed is determined by the following formula.

$$(\text{Reactor volume corresponding to catalyst packed bed})=(\text{cross-sectional area of reactor occupied by catalyst packed bed})\times(\text{height of catalyst packed bed})$$

Herein, the cross-sectional area of the reactor occupied by the catalyst packed bed indicates a cross-sectional area of a reactor packed with a catalyst packed bed. For example, when a reactor packed with a catalyst packed bed includes a casing tube provided with a thermocouple for measuring temperature, a cross-sectional area of the reactor excluding a cross-sectional area of the casing tube is regarded as the cross-sectional area of the reactor occupied by the catalyst packed bed.

The volume occupied by the catalyst packed bed can be determined, for example, by the following formula.

$$\text{Volume occupied by catalyst packed bed}=w(Vp+1/\rho)$$

w: Weight of catalyst packed bed [g]
Vp: Pore volume of catalyst packed bed per unit weight [cm$^3$/g]
$\rho$: Real density of catalyst packed bed [g/cm$^3$]

Note that when the catalyst packed bed is a mixture of substances having plurality of different real densities, the real density of the catalyst packed bed is calculated by a weighted average of the real densities of the substances.

Furthermore, when the catalyst packed bed includes same-size spherical packing materials and has a closet packing structure, the real density of the catalyst packed bed can be determined by the following formula.

$$\text{Volume occupied by catalyst packed bed}=(\text{reactor volume corresponding to catalyst packed bed})\times 0.74$$

The symbol a satisfies $0.30 \leq a \leq 0.55$ (e.g., $0.35 \leq a \leq 0.50$, or $0.40 \leq a \leq 0.45$). When a is 0.30 or more, pressure losses in the catalyst packed bed reduce, which may facilitate the operation. When a is 0.55 or less, the reactor volume for packing the catalyst required for a reaction becomes small, which is convenient in designing a reactor. In order to make the symbol a satisfy the above range, for example, the size of a particulate catalyst may be adjusted, or a pore and a wall thickness of a honeycomb catalyst may be adjusted.

In the methods described herein, the symbol L1 according can be, for example, defined by the following Formula (3).

$$L1=L2V/(P(aV+b))\times(T+273.14)/273.14 \qquad \text{Formula (3)}$$

L2: Superficial velocity of reaction gas [m/s]
P: Reaction pressure [atm]
T: Reaction temperature [° C.]
V: Reactor volume corresponding to catalyst packed bed [L]
a: Porosity of catalyst packed bed [−]
b: Pore volume of catalyst packed bed [L]

A superficial velocity (L2) of the reaction gas is calculated by the following formula.

L2=(Total supply rates of all gases supplied to catalyst packed bed under standard conditions (0° C., 1 atm))/(cross-sectional area of reactor occupied by catalyst packed bed)

The reaction gas has a superficial velocity (L2) of typically 0.05 to 8.0 m/s (e.g., 0.10 to 7.0 m/s, or 0.15 to 5.0 m/s). When L2 is 0.05 m/s or more, it may be easy to control heat generation in the catalyst packed bed. Furthermore, when L2 is 8.0 m/s or less, pressure losses may reduce and lead to energy efficiency.

The pore volume (b) of the catalyst packed bed is a value calculated by the following formula using the pore volume of the catalyst packed bed per unit weight and the weight of the catalyst packed bed determined by the mercury intrusion technique.

b=(Pore volume of catalyst packed bed per unit weight)×(weight of catalyst packed bed)

Herein, when the catalyst packed bed includes a packed catalyst and an inert substance for diluting the catalyst, the pore volume of the catalyst packed bed per unit weight is calculated by a weighted average of the pore volumes of the catalyst and the inert substance per unit weight.

The pore volume of the catalyst per unit weight can be, for example, from 0.01 to 1.5 cm$^3$/g (e.g., 0.1 to 1.0 cm$^3$/g, or 0.15 to 0.5 cm$^3$/g). A pore volume of 0.01 cm$^3$/g or more enables high catalytic activity, and a pore volume of 1.5 cm$^3$/g or less enables a catalyst strength that meets the industrial requirement. The pore volume of the inert substance per unit weight is not particularly limited, but can, for example, be 1.0 cm$^3$/g or less from a viewpoint of a strength that meets the industrial requirement.

A reaction pressure (P) is typically 0.1 to 20 atm (e.g., 0.5 to 10 atm, or 1.0 to 5.0 atm). P equal to 0.1 atm or more is advantageous in equilibrium. Moreover, P equal to 20 atm or less may be advantageous from a viewpoint of equipment cost.

A reaction temperature (T) is typically 50° C. to 500° C. (e.g., 100° C. to 450° C., or 200° C. to 350° C.). A reaction temperature of 50° C. or more enables a high conversion of a bromine compound, and a reaction temperature of 500° C. or less prevents volatilization of a catalyst component.

The symbol L1 defined by Formula (3) satisfies $0.40 \leq L1 \leq 6.0$ (e.g., $0.44 \leq L1 \leq 5.0$, or $0.48 \leq L1 \leq 4.0$). When L1 is 0.40 or more, it is easy to control heat generation in the catalyst packed bed. Moreover, L1 of 6.0 or less enables a high reaction yield. Adjusting L1 to fall within the above range maintains a stable activity of the catalyst and stably offers bromine in high yield. Accordingly, it is possible to achieve stability in catalyst cost, equipment cost, operation cost, and stable operation as well as easy operation. In order to make L1 satisfy the above range, for example, a flow rate of the reaction gas or the size of a catalyst molded body may be adjusted, or a diameter of a reaction tube may be adjusted.

In some examples of the methods described herein, a reaction technique can employ, for example, a fluidized bed, a fixed bed, and a moving bed. In some examples, the reaction technique can employ a fixed bed. Examples of the reactor include an adiabatic reactor and a heat exchanger reactor. In some examples, the reactor is an adiabatic reactor. When a fixed bed adiabatic reactor is used, a single-tube fixed bed reactor and a multi-tube fixed bed reactor may be employed. In some examples, when a fixed bed adiabatic reactor is used, a single-tube fixed bed reactor is employed. Furthermore, when a fixed bed heat exchanger reactor is used, a single-tube fixed bed reactor and a multi-tube fixed bed reactor may be employed. In some examples, when a fixed bed heat exchanger reactor is used, a multi-tube fixed bed reactor is employed.

A bromine compound in an outlet of the reactor has a conversion of 90% or more (e.g., 95% or more, or 99% or more). When a conversion of the bromine compound in the outlet of the reactor is less than 90%, a yield of bromine relative to a feed rate of the raw material decreases, which may lead to a cost disadvantage. Alternatively, considering recovery of an unreacted raw material and reuse of the same for a reaction, when the bromine compound has a conversion lower than 90% in the outlet of the reactor, the load on a recovery system increases, which may pose an obstacle to the process. The term the "outlet of the reactor" indicates a part, in the reactor provided with the catalyst packed bed, which is close to the outlet with respect to a gas flow direction. Furthermore, the part excludes the catalyst packed bed after the gas passes through the catalyst packed bed.

From a viewpoint of the conversion of the bromine compound, a temperature at the outlet of the reactor is can be 250° C. to 400° C. (e.g., 280° C. to 350° C.). In order to satisfy the above range of the temperature at the outlet of the reactor, the temperature of the reactor may be adjusted.

The reactor can, for example, have two or more catalyst packed beds connected in series. An example of advantages derived from such an arrangement includes easiness in controlling a reaction because the amount of catalyst used in each catalyst packed bed and the temperature of the catalyst bed are determined individually. Examples of a method for forming two or more catalyst packed beds include a technique to pack catalysts having different types of activities, compositions and/or particle sizes in the axial direction of a reaction tube, a technique to pack a catalyst by changing a dilution rate of a packing material molded by an inert substance and/or a support, and a technique to pack a catalyst and a packing material obtained by diluting the catalyst with an inert substance and/or a support. Typically, adjacent catalyst packed beds are connected directly, but an inert substance may be packed between the two catalyst packed beds. However, a packed bed consisting of an inert substance is not considered to be a catalyst packed bed. The more the number of catalyst packed beds increases, the more effectively the catalyst packed beds are used. Note that, from the industrial point of view, the number of catalyst packed beds is typically 2 to 20 (e.g., 2 to 8, or 2 to 4).

When a reactor provided with two or more catalyst packed beds is used, from a viewpoint of the yield of bromine, a temperature at an outlet of the lowermost catalyst packed bed with respect to the gas flow direction can be lower than a temperature at an outlet of the catalyst packed bed of immediately upstream side of the lowermost catalyst packed bed. From a viewpoint of the conversion of the bromine compound, a temperature at the outlet of the lowermost catalyst packed bed with respect to the gas flow direction can be 250° C. to 400° C. (e.g., 280° C. to 350° C.).

In supplying an oxygen-containing gas, the oxygen-containing gas may be supplied to each catalyst packed bed. An example of advantages derived from supplying an oxygen-containing gas to each catalyst packed bed includes reduction in deterioration of the catalyst because the supply of the oxygen-containing gas prevents excessive heat generation in a catalytic bed due to an oxidation reaction of a bromine compound.

The gas flow direction toward the catalyst packed beds may be vertically upward or downward.

When using a reaction tube for the reactor, an inner diameter of the reaction tube is typically 10 to 50 mm (e.g., 10 to 40 mm, or 10 to 30 mm). The reaction tube having too small an inner diameter may cause disadvantages because an excessive number of reaction tubes is required to obtain a sufficient amount of bromine compounds treated in an industrial reaction device. Furthermore, too large an inner diameter may cause excessive hot spots in the catalyst packed beds.

The ratio (D/d) of an inner diameter of the reaction tube (D) to a catalyst diameter (d) is typically 5/1 to 100/1 (e.g., 5/1 to 50/1, or 5/1 to 20/1). Too small a ratio may cause excessive hot spots in the catalyst packed beds and may cause disadvantages because a large number of reaction tubes is required to obtain a sufficient amount of bromine compounds that meets the industrial requirements. Furthermore, too large a ratio may cause excessive hot spots in the catalyst packed beds or may increase pressure losses in the catalyst packed beds.

An example of the catalyst used herein includes a known catalyst that is used for oxidizing a bromine compound to produce bromine. Examples of such a catalyst include a catalyst containing copper chloride and potassium chloride to which various compounds are added as a third component, a catalyst containing chromium oxide as the main component, and a catalyst containing ruthenium oxide. In some examples, the catalyst can comprise at least one metal or metal compound selected from the group consisting of ruthenium, a compound of ruthenium, copper, a compound of copper, titanium, and a compound of titanium. In some examples, the catalyst can comprise at least one metal selected from the group consisting of ruthenium, a compound of ruthenium, titanium, and a compound of titanium. In some examples, the catalyst can comprise ruthenium oxide and titanium oxide.

In some examples of the methods described herein, when the catalyst used in the is a catalyst containing at least one selected from the group consisting of metallic ruthenium and a ruthenium compound (which may hereinafter be referred to as "ruthenium component"), the metallic ruthenium refers to single-metal ruthenium. Examples of the ruthenium compound include oxides such as $RuO_2$, $RuO_4$, $Ru_2O_3$, and $Ru_2O_7$, oxyhydroxides or hydroxides such as $RuO(OH)_2$, $Ru(OH)_3$, and $Ru(OH)_4$, halides such as $RuCl_3$ and $RuBr_3$, halogeno acid salts such as $K_3RuCl_6$ and $K_2RuCl_6$, oxo acid salts such as $K_2RuO_4$, oxyhalides such as $Ru_2OCl_4$, $Ru_2OCl_5$, and $Ru_2OCl_6$, halogeno complexes such as $K_2[RuCl_5(H_2O)]_4$, $[RuCl_2(H_2O)_4]Cl$, $K_2[Ru_2OCl_{10}]$, and $Cs_2[Ru_2OCl_4]$, ammine complexes such as $[Ru(NH_3) sH_2O]Cl_2$, $[Ru(NH_3)_5Cl]Cl_2$, $[Ru(NH_3)_6]Cl_2$, $[Ru(NH_3)_6]Cl_3$, and $[Ru(NH_3)_6]Br_3$, carbonyl complexes such as $Ru(CO)_5$ and $Ru_3(CO)_{12}$, carboxylato complexes such as $[Ru_3O(OCOCH_3)_6(H_2O)_3]OCOCH_3$ and $[Ru_2(OCOR)_4]Cl$ (R is a $C_{1-3}$ alkyl group), nitrosyl complexes such as $K_2[RuCl_5(NO)]$, $[Ru(NH_3)_5(NO)]Cl_3$, $[Ru(OH)(NH_3)_4(NO)](NO_3)_2$, and $[Ru(NO)](NO_3)_3$, phosphine complexes, amine complexes, acetylacetonato complexes, and composite oxides of ruthenium oxide and other oxides. Examples of other oxides in the composite oxides include titanium oxide, zirconium oxide, alumina, silica, vanadium oxide, boron oxide, chromium oxide, niobium oxide, hafnium oxide, tantalum oxide, and tungsten oxide. The composite oxides may contain two or more of these oxides as needed. Note that the ruthenium compound herein may be a hydrate thereof, or may be a mixture of two or more kinds of ruthenium compounds. In some examples, the ruthenium compound can comprise a ruthenium oxide. For example, the ruthenium oxide can comprise ruthenium dioxide ($RuO_2$) or a ruthenium oxide with a different structure. In some examples, the ruthenium oxide can comprise an oxide of ruthenium wherein the oxidation number of ruthenium is +4, or wherein the ruthenium has another oxidation number. Depending on reaction conditions, in the catalyst, metallic ruthenium may be converted to ruthenium oxide after reaction, or the ruthenium compound may be converted to metallic ruthenium.

As a ruthenium component-containing catalyst, metallic ruthenium or a ruthenium compound may be used. However, in order to reduce the used amount of expensive metallic ruthenium or that of a ruthenium compound, a catalyst having a ruthenium component supported on a support can be employed. Examples of the support include titanium oxide, alumina, zirconium oxide, zeolite, silica, silica alumina, vanadium oxide, diatomaceous earth, composite oxides of titanium oxide and other oxides, composite oxides of zirconium oxide and other oxides, composite oxides of alumina and other oxides, and metal sulfates. Two or more of these examples may be used in combination as needed. In some examples, the support can be selected from the group consisting of titanium oxide, alumina, zirconium oxide, and combinations thereof. In some examples, the support is zirconium oxide.

The support may be obtained by kneading, molding, and then calcination a powdered or sol support. The fired support may be prepared based on a known method. For example, after a powdered support or a sol support is kneaded with a molding aid such as an organic binder and water and the support is extruded to form noodles, the support is dried and grinded to obtain a molded body, and then, the resulting molded body is fired under an oxidizing gas atmosphere such as air.

When the support contains titanium oxide, the titanium oxide may be rutile titanium oxide (titanium oxide having a rutile type crystal structure), anatase titanium oxide (titanium oxide having an anatase type crystal structure), amorphous titanium oxide, or a mixture of these examples.

The surface of titanium oxide may be treated, for example, to inhibit a substance that causes catalyst poisoning from adsorbing onto the surface of a catalyst and to prevent deterioration of the performance of the catalyst.

Metal oxides and metal hydroxides are examples of inorganic substances used for surface treatment of titanium oxide. Examples of metal in metal oxides and metal hydroxides include aluminum, silicon, zinc, titanium, zirconium, iron, cerium, and tin.

Metal salts used to obtain metal oxides or hydroxides are not particularly limited.

Fatty acids and silylating agents are examples of organic substances used for surface treatment of titanium oxide. Examples of fatty acids include stearic acid, oleic acid, isostearic acid, and myristic acid. Examples of silylating agents include organic silanes, organic silyl amines, organic silyl amides and derivatives thereof, and organic silazanes.

Examples of organic silanes include chlorotrimethylsilane, dichlorodimethylsilane, chlorobromodimethylsilane, nitrotrimethylsilane, chlorotriethylsilane, iodotrimethylbutylsilane, chlorodimethylphenylsilane, chlorodimethylsilane, dimethyl n-propylchlorosilane, dimethylisopropylchlorosilane, t-butyldimethylchlorosilane, tripropylchlorosilane, dimethyloctylchlorosilane, tributylchlorosilane, trihexylchlorosilane, dimethylethylchlorosilane, dimethyloctadecylchlorosilane, n-butyldimethylchlorosilane, bromomethyldimethylchlorosilane, chloromethyldimethylchlorosilane, 3-chloropropyl dimethylchlorosilane, dimethoxymethylchlorosilane, methylphenylchlorosilane, triethoxychlorosilane, dimethylphenyl chlorosilane, methyl phenyl vinyl chlorosilane, benzyl dimethyl chlorosilane, diphenyl chlorosilane, diphenylmethylchlorosilane, diphenyl vinyl chlorosilane, tribenzyl chlorosilane, and 3-cyanopropyl dimethylchlorosilane.

Examples of organic silyl amines include N-trimethylsilylimidazole, N-tert-butyldimethylsilylimidazole, N-dimethylethylsilylimidazole, N-dimethyl n-propylsilylimidazole, N-dimethylisopropylsilylimidazole, N-trimethylsilyldimethylamine, N-trimethylsilyldiethylamine, N-trimethylsilylpyrrole, N-trimethylsilylpyrrolidine, N-trimethylsilylpiperidine, 1-cyanoethyl (diethylamino) dimethylsilane, and pentafluorophenyldimethylsilylamine.

Examples of organic silyl amides and derivatives thereof include N,O-bistrimethylsilylacetamide, N,O-bistrimethylsilyltrifluoroacetamide, N-trimethylsilylacetamide, N-methyl-N-trimethylsilylacetamide, N-methyl-N-trimethylsilyltrifluoroacetamide, N-methyl-N-trimethylsilyl heptafluorobutyl amide, N-(tert-butyldimethylsilyl)-N-trifluoroacetamide, and N,O-bis(diethylhydrosilyl) trifluoroacetamide.

Examples of organic silazane include hexamethyldisilazane, heptamethyldisilazane, 1,1,3,3-tetramethyldisilazane, 1,3-bis (chloromethyl)tetramethyldisilazane, 1,3-divinyl-1,1,3,3-tetramethyldisilazane, and 1,3-diphenyltetramethyldisilazane.

Other examples of the silylating agents include N-methoxy-N,O-bistrimethylsilyl trifluoroacetamide, N-methoxy-N,O-bistrimethylsilyl carbamate, N,O-bistrimethylsilyl sulfamate, trimethylsilyl trifluoromethanesulfonate, and N, N'-bistrimethylsilyl urea.

In some examples, the silylating agents is an organic silazane, such as hexamethyldisilazane.

When the support contains alumina, examples of alumina include α-alumina, γ-alumina, θ-alumina, δ-alumina, β-alumina, amorphous alumina, and boehmite. One or two or more of these examples may be mixed in use. In some examples, the support comprises α-alumina.

An example of a method for supporting a ruthenium component on a support includes a technique to bring a ruthenium component-containing solution into contact with the support. A temperature during the contact process is typically 0° C. to 100° C. (e.g., 0° C. to 50° C.). A pressure during the contact process is typically 0.1 to 1 MPa (e.g., atmospheric pressure). Such a contact process may be carried out under air atmosphere or under an inert gas atmosphere such as nitrogen, helium, argon, and carbon dioxide, and these exemplary atmospheres may include water vapor.

Examples of the contact process includes impregnation and immersion. Examples of the process to make the support contact with the solution include (A) a technique to impregnate the support with the ruthenium component-containing solution, and (B) a technique to immerse the support in the ruthenium component-containing solution. In some examples, the process to make the support contact with the solution includes technique (A).

In some examples, the solvent used to prepare the solution is water. Examples of water includes highly purified water such as distilled water, ion-exchange water, and ultrapure water. When water used herein contains a large amount of impurities, the impurities attach to the catalyst, which may reduce the activity of the catalyst. The amount of water used is typically 1.5 to 8000 mol (e.g., 3 to 2500 mol, or 7 to 1500 mol) per 1 mol of the ruthenium component contained in the solution.

In some examples, after supporting the ruthenium component on the support, the support can be dried and then fired. As such a drying process, a method known in the related art may be employed. A temperature during the drying process is typically about room temperature to 100° C. A pressure during the drying process is typically 0.001 to 1 MPa (e.g., atmospheric pressure). Such a drying process may be carried out under air atmosphere or under an inert gas atmosphere such as nitrogen, helium, argon, and carbon dioxide, and these exemplary atmospheres may include water vapor. In some examples, the drying process can be carried out under an inert gas atmosphere. An inert gas atmosphere can be selected, for example, from an ease-of-use point of view.

The calcination may be performed under an oxidizing gas, a reducing gas, or an inert gas atmosphere, and may be performed in multiple steps by combining these gas atmospheres. The oxidizing gas is a gas containing an oxidizing substance. An example of the oxidizing gas includes an oxygen-containing gas, and the oxygen concentration thereof is typically about 1% to 30% by volume. As an oxygen source, air or pure oxygen is typically used, and as needed, air or pure oxygen is diluted with an inert gas or water vapor. In some examples, the oxidizing gas can be air. A calcination temperature is typically 100° C. to 1000° C. (e.g., 200° C. to 450° C.). By calcination under an oxidizing gas atmosphere, the supported ruthenium component may be converted to ruthenium oxide.

The reducing gas is a gas containing a reducing substance. Examples of the reducing gas include a hydrogen-containing gas, a carbon monoxide-containing gas, and a hydrocarbon-containing gas. The concentration of the gas is typically about 1% to 30% by volume, and the concentration is adjusted with, for example, an inert gas or water vapor. In some examples, the reducing gas can comprise a hydrogen-containing gas and/or a carbon monoxide-containing gas. A calcination temperature is typically 100° C. to 1000° C. (e.g., 200° C. to 500° C.). By calcination under a reducing gas atmosphere, the supported ruthenium component may be converted to metallic ruthenium.

Examples of the inert gas include nitrogen, carbon dioxide, helium, and argon. Those examples are diluted with water vapor as needed. In some examples, the inert gas can include nitrogen and/or carbon dioxide. A calcination temperature is typically 100° C. to 1000° C. (e.g., 200° C. to 600° C.)

In the catalyst having a ruthenium component supported on a support, the content ratio of at least one selected from the group consisting of metallic ruthenium and a ruthenium compound to the support (ruthenium component/support) is, as the ratio by weight, typically 0.1/99.9 to 20/80 (e.g., 0.5/99.5 to 15/85, or 0.5/99.5 to 5/95). When the ruthenium component is supported on the support, the ratio of the ruthenium component to the support is appropriately set so that the ratio falls within the above range. Too small an amount of ruthenium component supported on the support may lead to insufficient catalytic activity, and too large an amount thereof may lead to a cost disadvantage.

The ruthenium component-containing catalyst may contain, in addition to the ruthenium component, other components such as palladium, a copper compound, a chromium compound, a vanadium compound, an alkali metal compound, a rare earth compound, a manganese compound, and an alkaline earth compound. The amount of other components contained is typically 0.1% to 10% by weight relative to the total amount of the support and the other components.

Examples of the shape of the catalyst include, but is not limited to, spherical particle, cylindrical pellet, extruded shape, ring, honeycomb, or granule that has a suitable size obtained by grinding and classification after molding. Herein, the catalyst can have a diameter of 5 mm or less. Too large a diameter of the catalyst may lead to a low conversion of hydrogen bromide. The diameter of the catalyst does not have a particular lower limit. However, too small a diameter increases pressure losses in the catalytic bed. Accordingly, one having a diameter of 0.5 mm or more is typically used. When the catalyst has a spherical particle shape, "the diameter of the catalyst" indicates a diameter of the sphere. When the catalyst has a cylindrical pellet shape, "the diameter of the catalyst" indicates a circular cross section of the cylindrical pellet. With regard to other shapes, "the diameter of the catalyst" indicates a maximum diameter of each cross section.

In some examples, the catalyst can be produced by the aforementioned method or can be a commercially available product.

When using the catalyst, the catalyst can, for example, be diluted with, for example, titania, alumina, zirconia, and silica.

When a reactor having two or more catalyst packed beds is used, from a viewpoint of reducing catalyst costs and preventing heat generation in the catalyst packed beds, a catalyst in the uppermost catalyst packed bed can be titanium oxide, and a catalyst in the lowermost catalyst packed bed can be one that contains at least one selected from the group consisting of metallic ruthenium and a ruthenium compound with respect to the gas flow direction. For example, when a catalyst with a low catalytic activity is packed in an upstream side and a catalyst with a high catalytic activity is packed in a downstream side with respect to the gas flow direction, and when the temperature of each catalyst packed bed is independently adjusted, it is possible to prevent a rapid increase in conversion of a bromine compound at an inlet of each catalyst packed bed and to prevent heat generation in each catalyst packed bed with respect to the gas flow direction. Accordingly, it is possible to prevent catalyst degradation due to heat, which enables long-term use of the catalyst.

The amount (volume) of the catalyst used is typically 10 to 100,000 $h^{-1}$ (e.g., 100 to 50,000$h^{-1}$, or 200 to 5000 $h^{-1}$), where the amount is represented by the ratio (space velocity) between a supply rate of the bromine compound under standard conditions (0° C., 0.1 MPa). A space velocity of 10 $h^{-1}$ or more is cost-effective, and a space velocity of 100,000 $h^{-1}$ or less enables a high conversion of the bromine compound.

Examples of the present invention will hereinafter be described, but the present invention is not limited thereto. In the examples, parts and percentages representing used amounts or contained amounts are by weight unless otherwise specified. The rutile titania ratio of titania supports was determined by XRD analysis, and the sodium content and the calcium content in the titania supports relative to the supports were determined by TCP analysis. A gas supply rate (ml/min) is a converted value of 0° C. and 0.1 MPa, unless otherwise specified.

EXAMPLE

Example 1

<Preparation of Support>

A hundred parts of titania powder (F—IR, a product of Showa Denko K.K., rutile titania ratio 93%) and 2 parts of an organic binder (YB-152A, a product of Yuken Industries Co., Ltd.) were mixed. Then, 29 parts of pure water and 12.5 parts of titania sol (CSB, a product of Sakai Chemical Industry Co., Ltd., titania content 40%) were added to the mixture, and the mixture was kneaded. The mixture was extruded to form noodles having a diameter of 3.0 mm, dried at 60° C. for 2 hours, and then grinded to have a length of about 3 to 5 mm. The resulting molded body was heated in air over 1.7 hours from room temperature to 600° C., and then, the body was held and calcined at the same temperature for 3 hours. Furthermore, 60.0 g (volume: 46 mL) of the resulting calcined body was put in a 200 mL eggplant flask and placed in a rotary impregnating and drying machine. A solution prepared by dissolving 1.70 g of tetraethyl orthosilicate [$Si(OC_2H_5)_4$, a product of FUJIFILM Wako Pure Chemical Corporation] in 9.26 g of ethanol was dripped in the eggplant flask over 20 minutes while the eggplant flask was inclined at a 60-degree angle from the vertical direction and was rotated at 80 rpm, whereby impregnating the body with the solution. Next, while the eggplant flask was rotated at 80 rpm, the temperature in the eggplant flask was set to 30° C., and 277 mL/min (0° C., in 0.1 MPa equivalent) of a mixed gas of water vapor and nitrogen (water vapor concentration: 2.7% by volume) was allowed to flow inside the eggplant flask for consecutive 4 hours and 30 minutes. The ratio (GHSV) of a supply rate of the mixed gas to a volume of the calcined body was 360/h (0° C., in 0.1 MPa equivalent). Under flowing air, 61.5 g of the resulting dried body was heated over 1.2 hours from room temperature to 300° C., and then, the body was held and calcined at the same temperature for 2 hours, whereby yielding 59.9 g of titania supports having silica supported on titania. The resulting titania supports were subjected to ICP analysis by an ICP Emission Spectroscopy (IRIS Advantage, a product of Nippon Jarrell-Ash Co., Ltd.) to determine the silica content, which was 0.80% by weight (silicon content: 0.37% by weight).

<Preparation of Supported Ruthenium Oxide Catalyst>

The resulting titania supports in an amount of 50.17 g were impregnated with an aqueous solution prepared by dissolving 1.21 g of ruthenium chloride hydrate ($RuCl_3$/$nH_2O$, a product of NE Chemcat Co., Ltd., Ru content 40.0%) in 11.1 g of pure water to obtain a solid. Under flowing air, the resulting solid was held and dried at 100° C. for 10 hours, and then, stored at room temperature for 5 days under an air atmosphere. Under flowing air, the resulting dried body was held and calcined at 300° C. for 2 hours, whereby yielding 50.5 g of blue-grey supported ruthenium oxides having 1.25% of the ruthenium oxide content. The pore volume of the supported ruthenium oxide catalyst per unit weight determined by the mercury intrusion technique was 0.23 $cm^3$/g, and the real density was 4.1 $g/cm^3$.

<Assessment of Catalyst Activity>

The resulting supported ruthenium oxides in an amount of 20.0 g was diluted with 20.0 g of α-alumina spheres having a diameter of 2 mm (SSA995, a product of Nikkato Corporation, real density 4.0 $g/cm^3$) and packed in a Ni reaction tube (an inner diameter: 14 mm, an outer diameter of a casing tube for temperature measurement: 3 mm). Herein, a height of the catalyst packed bed was 18 cm, and porosity (a) of the catalyst packed bed was 0.45.

Then, a hydrogen bromide gas, an oxygen gas, and a nitrogen gas were supplied to the reaction tube at rates of 400 ml/min, 200 ml/min, and 800 ml/min, respectively, under ordinary pressure (1 atm). A reaction was carried out by heating the reaction tube so that an average temperature of the catalyst packed bed became 259° C. Here, a superficial velocity (L2) of the reaction gas was 0.159 m/s, a reactor volume (V) corresponding to the catalyst packed bed was 26.1 cm³, and a pore volume (b) of the catalyst packed bed was 4.60 cm³. Accordingly, it was calculated that L1 was 0.498 m/s.

One hour after the start of the reaction, the gas at an outlet of the reaction tube was allowed to flow through a 30% aqueous potassium iodide solution for sampling for 10 minutes. An amount of bromine generated was measured by the iodine titration method, whereby determining a generation rate of bromine (mol/h). Based on the generation rate of bromine and a supply rate of hydrogen bromide, a conversion of hydrogen bromide was calculated from the following formula. The value was 90%.

Conversion of hydrogen bromide (%)=[((generation rate of bromine (mol/h))×2)/(supply rate of hydrogen bromide (mol/h))]×100

Comparative Example 1

In Comparative Example 1, the activity of supported ruthenium oxides was assessed in a manner similar to Example 1 except that 10.0 g of supported ruthenium oxides and 10.0 g of α-alumina spheres were used, and that supply rates of a hydrogen bromide gas, an oxygen gas, and a nitrogen gas were set to 200 ml/min, 100 ml/min, and 400 ml/min, respectively, and that an average temperature of a catalytic bed was set to 260.6° C. A conversion of hydrogen bromide in Comparative Example 1 was 72%. Herein, a height of the catalyst packed bed was 8 cm, and it was calculated that porosity (a) of the catalyst packed bed was 0.40. A superficial velocity (L2) of the reaction gas was 0.079 m/s, a reactor volume (V) corresponding to the catalyst packed bed was 12.0 cm³, and a pore volume (b) of the catalyst packed bed was 2.30 cm³. Accordingly, it was calculated that L1 was 0.264 m/s.

Comparative Example 2

In Comparative Example 2, the activity of supported ruthenium oxides was assessed in a manner similar to Example 1 except that 2.0 g of supported ruthenium oxides and 2.0 g of α-alumina spheres were used, and that supply rates of a hydrogen bromide gas, an oxygen gas, and a nitrogen gas were set to 40 ml/min, 20 ml/min, and 80 ml/min, respectively, and that an average temperature of a catalytic bed was set to 258.7° C. A conversion of hydrogen bromide in Comparative Example 2 was 74%. Herein, a height of the catalyst packed bed was 2 cm, and it was calculated that porosity (a) of the catalyst packed bed was 0.45. A superficial velocity (L2) of the reaction gas was 0.016 m/s, a reactor volume (V) corresponding to the catalyst packed bed was 2.6 cm³, and a pore volume (b) of the catalyst packed bed was 0.46 cm³. Accordingly, it was calculated that L1 was 0.050 m/s.

What is claimed is:

1. A method for producing bromine, comprising
a step of supplying a gas containing a bromine compound and a gas containing oxygen to a reactor that includes a catalyst packed bed, and oxidizing the bromine compound to obtain a gas containing bromine,
wherein the step satisfies the following Inequality (1) and Inequality (2):

$$0.30 \leq a \leq 0.55 \quad \text{Inequality (1)}$$

$$0.40 \leq L1 \leq 6.0 \quad \text{Inequality (2)}$$

where "a" represents porosity [–] of the catalyst packed bed, and "L1" is defined by the following Formula (3):

$$L1 = L2V/(P(aV+b)) \times (T+273.14)/273.14 \quad \text{Formula (3)}$$

L2: Superficial velocity of reaction gas [m/s]
P: Reaction pressure [atm]
T: Reaction temperature [° C.]
V: Reactor volume corresponding to catalyst packed bed [L]
a: Porosity of catalyst packed bed [–]
b: Pore volume of catalyst packed bed [L].

2. The method for producing bromine according to claim 1, wherein the bromine compound is hydrogen bromide.

3. The method for producing bromine according to claim 1, wherein the bromine compound in an outlet of the reactor has a conversion of 90% or more.

4. The method for producing bromine according to claim 1, wherein a temperature at an outlet of the reactor is 250° C. to 400° C.

5. The method for producing bromine according to claim 1, wherein the catalyst is at least one type of metal or metal compound selected from the group consisting of ruthenium, a compound of ruthenium, copper, a compound of copper, titanium, and a compound of titanium.

6. The method for producing bromine according to claim 1, wherein the reactor is an adiabatic reactor.

7. The method for producing bromine according to claim 1, wherein the reactor includes two or more catalyst packed beds connected in series.

8. The method for producing bromine according to claim 7, wherein a temperature at an outlet of the lowermost catalyst packed bed with respect to a flow direction of the gas containing a bromine compound is lower than a temperature at an outlet of the catalyst packed bed of immediately upstream side of the lowermost catalyst packed bed.

9. The method for producing bromine according to claim 7, wherein the uppermost catalyst packed bed with respect to a flow direction of the gas containing a bromine compound includes titanium oxide as a catalyst, and the lowermost catalyst packed bed with respect to a flow direction of the gas containing a bromine compound includes at least one selected from the group consisting of metallic ruthenium and a ruthenium compound as a catalyst.

10. The method for producing bromine according to claim 7, further comprising
supplying the gas containing oxygen to each catalyst packed bed.

* * * * *